US005169214A

United States Patent [19]

Holzmann et al.

[11] Patent Number: 5,169,214

[45] Date of Patent: Dec. 8, 1992

[54] HYDRAULIC MULTI-CIRCUIT BRAKE SYSTEM INCLUDING A TRACTION AND ANTI-SKID CONTROL DEVICE FOR MOTOR VEHICLES

[75] Inventors: Roland Holzmann, Stuttgart; Karl-Heinz Willmann, Freiberg, both of Fed. Rep. of Germany

[73] Assignee: Robert Bosch GmbH, Stuttgart, Fed. Rep. of Germany

[21] Appl. No.: 763,009

[22] Filed: Sep. 20, 1991

[30] Foreign Application Priority Data

Oct. 26, 1990 [DE] Fed. Rep. of Germany ....... 4034113

[51] Int. Cl.[5] ............................................ B60K 28/16

[52] U.S. Cl. .............................. 303/113.2; 303/116.1

[58] Field of Search ........ 303/113 TR, 113 R, 116 R, 303/113 AP, 0.1, 0.2, 0.3, 0.4, 0.5, 0.6, 116 SP

[56] References Cited

U.S. PATENT DOCUMENTS

| | | | |
|---|---|---|---|
| 4,569,560 | 2/1986 | Kubo | 303/116 R |
| 4,687,266 | 8/1987 | Matsui et al. | 303/116 R |
| 4,861,116 | 8/1989 | Bernhardt et al. | 303/100 |
| 4,861,118 | 8/1989 | Burckhardt et al. | 303/113 TR |
| 5,026,124 | 6/1991 | Resch | 303/116 R |
| 5,026,127 | 6/1991 | Arikawa | 303/116 R |

FOREIGN PATENT DOCUMENTS

| | | |
|---|---|---|
| 0156323 | 10/1985 | European Pat. Off. . |
| 1924565 | 11/1970 | Fed. Rep. of Germany . |
| 2352284 | 4/1975 | Fed. Rep. of Germany . |
| 3741310 | 6/1989 | Fed. Rep. of Germany . |

*Primary Examiner*—Matthew C. Graham
*Attorney, Agent, or Firm*—Edwin E. Greigg; Ronald E. Greigg

[57] ABSTRACT

A multi-circuit brake system having an anti-skid and traction control device for non-delayed, driver-activated braking. The multi-circuit brake system has a self-aspirating pump, which in case of traction control operation aspirates pressure medium from a pressure medium reservoir via an aspirating line and a main brake cylinder. A valve assembly in the brake line of the non-powered vehicle wheel is switched to maintain pressure in this case. A valve assembly, open in case of traction control operation, is located in the aspirating line. An auxiliary brake line with a pressure-controllable valve assembly originates at the aspirating line on the side towards the pump, when the valve assembly in the aspirating line is open, brake pressure generated by the driver by activating the main brake cylinder can be supplied to the wheel brake of the non-powered vehicle wheel. The invention is particularly suited for motor vehicles.

7 Claims, 1 Drawing Sheet

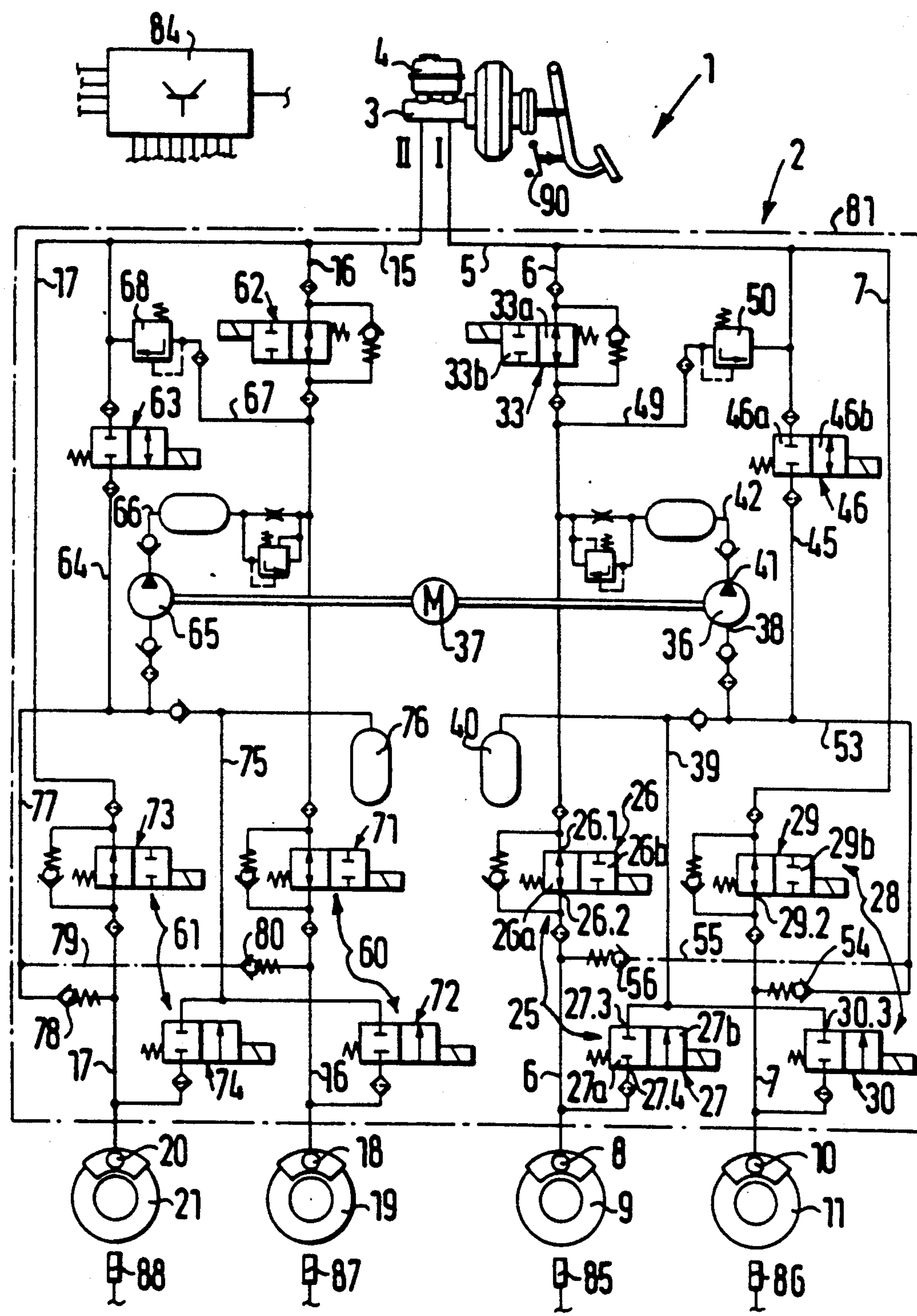
84
4
3
1
2
II
I
90
81
17
68
62
16
15
5
6
33a
50
7
33b
33
49
46a
46b
63
67
46
66
42
45
64
41
65
37
36
38
76
40
75
39
53
77
73
71
26
26.1
26b
29
29b
28
26a
26.2
29.2
79
61
80
60
55
54
56
78
74
72
25
27.3
27b
30.3
17
16
6
27a
27.4
27
7
30
20
18
8
10
21
19
9
11
88
87
85
86

HYDRAULIC MULTI-CIRCUIT BRAKE SYSTEM INCLUDING A TRACTION AND ANTI-SKID CONTROL DEVICE FOR MOTOR VEHICLES

The invention relates to a hydraulic multi-circuit brake system as set forth hereinafter.

BACKGROUND OF THE INVENTION

A hydraulic multi-circuit brake system of this type is already known (German Published, Non-Examined Patent Application DE-OS 37 41 310; U.S. Pat. No. 4,861,116), where the first valve assembly of the wheel brake assigned to the non-powered vehicle wheel consists of two 2/2-way valves, of which the so-called inlet valve is located in the brake line, while the so-called outlet valve has a third connection of the first valve assembly and is located in an outflow line which originates at the brake line between the inlet valve and the wheel brake and leads to the input side of the pump. In the case of traction control operation, the two directional control valves of the first valve assembly are placed in the open position and the second valve assembly in the brake line of the powered vehicle wheel is in the blocking position, so that the pump can aspirate pressure medium from a pressure medium reservoir via the main brake cylinder, supply it to the brake line of the powered vehicle wheel and build up brake pressure in the assigned wheel brake. In this case, because of the outlet valve assuming its open position, generation of harmful underpressure in the wheel brake cylinder of the non-powered wheel at the start of the pressure means that supply is not completely impossible. Furthermore, when the driver triggers braking in the case of traction control operation, brake pressure cannot immediately build up in the wheel brake cylinders, since the brake line of the wheel brake assigned to the powered wheel is blocked until the switching of the second valve assembly, and the pressure medium supplied to the brake line of the wheel brake assigned to the non-powered vehicle wheel can flow off towards the pump until the outlet valve is closed.

OBJECT AND SUMMARY OF THE INVENTION

The hydraulic multi-circuit brake system in accordance with the invention, has an advantage that in the case of traction control operation, non-delayed braking triggered by the driver is possible because, until closing of the third valve assembly and opening of the second valve assembly, as well as switching of the first valve assembly of the non-powered vehicle wheel into the brake build-up position, brake pressure can be supplied to the wheel brake of the non-powered wheel from the main brake cylinder via the aspirating line and the auxiliary brake line, while overcoming the fourth valve assembly. This prevents a loss of the braking distance. In the case of traction control operation, it is also advantageous to switch the first valve assembly of the non-powered vehicle wheel into the position where pressure is maintained, because this prevents the appearance of underpressure with the possible result of air being aspirated into the wheel brake cylinder of this wheel.

Advantageous further embodiments and improvements of the hydraulic multi-cylinder brake system disclosed herein are possible by measures recited herein.

By virtue of a further embodiment of the brake assembly, the wheel brake of the powered vehicle wheel in the brake circuit is also included in a simple manner in the non-delayed brake pressure supply in case of braking triggered by the driver.

The invention will be better understood and further objects and advantages thereof will become more apparent from the ensuing detailed description of preferred embodiments taken in conjunction with the drawings.

BRIEF DESCRIPTION OF THE DRAWINGS

The single drawing shows a block diagram of a hydraulic multi-circuit brake system for motor vehicles.

DESCRIPTION OF THE PREFERRED EMBODIMENT

A hydraulic multi-circuit brake system 1 for motor vehicles illustrated in the drawings is equipped with an anti-skid and traction control device 2 shown in a block 81. The brake system 1 has a pedal-operated main brake cylinder 3 with a pressure medium reservoir 4 placed on it. A main brake line 5 of a first brake circuit I originates at the brake cylinder 3. The main brake line 5 branches into two brake lines 6 and 7. The brake line 6 leads to a wheel brake cylinder 8 of a wheel brake 9 of a powered vehicle wheel, not shown. The brake line 7 is connected with the wheel brake cylinder 10 of a wheel brake 11 of a non-powered vehicle wheel, also not shown.

A main brake line 15 of a second brake circuit II also originates at the main brake cylinder 3. The main brake line 15 continues as two brake lines 16 and 17. The brake line 16 terminates at a wheel brake cylinder 18 of the wheel brake 19 of a powered vehicle wheel, not shown. The brake line 17 is connected with the wheel brake cylinder 20 of the wheel brake 21 of a non-powered vehicle wheel, also not shown. The powered vehicle wheels to which the wheel brakes 9 and 19 are assigned are part of one vehicle axle; the non-powered vehicle wheels to which the wheel brakes 11 and 21 are assigned are part of a second axle of the vehicle. The association of the vehicle brakes has been chosen in such a way that the two wheel brakes 9 and 11 or 19 and 21 of the respective brake circuit I or II are located diagonally across from each other. Since the two brake circuits I and II are identically equipped, only the brake circuit I will be described in detail below.

A first valve assembly 25 is assigned to the wheel brake 9 of the powered vehicle wheel. It comprises an inlet valve 26 and an outlet valve 27. The two valves 26 and 27 are embodied as 2/2-way valves. The first valve assembly 25 may also be embodied as a 3/3-way valve, not shown, located in the brake line 6. The inlet valve 26 has a spring-actuated open position *26a* and an electromagnetically controllable blocking position *26b*. The outlet valve 27 has a spring-actuated blocking position *27a* and an electromagnetically controlled open position *27b*. The first valve assembly 25 has the following connections: at the inlet valve 26, a first connection 26.1 on the side towards the main brake cylinder and a second connection 26.2 for the brake line 6 on the side towards the wheel brake; at the outlet valve 27, a third connection 27.3 for supplying pressure medium taken from the wheel brake 9, which can be supplied to a fourth connection 27.4. The first valve assembly 25 ca be switched into positions for pressure build-up, pressure maintenance and pressure release in the wheel brake cylinder 8 of the wheel brake 9. As illustrated, in the switching position for pressure build-up, the inlet valve 26 assumes its open position *26a* and the outlet valve 27 its blocking position *27a*. In the switching position for pressure maintenance, the inlet valve 26 as well as the outlet valve 27 are switched into their blocking position 26*a* and 27*a*. In the switching position for pressure release, the inlet valve 26 assumes its blocking position 26*b*, the outlet valve 27 is switched into its open position 27*b*.

A first valve assembly 28 with an inlet valve 29 and an outlet valve 30 is assigned to the wheel brake 11 of the non-powered vehicle wheel. In the same way as the valve assembly 25, the valve assembly 28 has connections and switching positions for pressure build-up, pressure maintenance and pressure release.

A second valve assembly 33 is provided between the main brake cylinder 3 and the first valve assembly 25 in the brake line 6 of the powered vehicle wheel assigned to the wheel brake 9. This valve assembly 33 is embodied as a 2/2-way valve and has a spring-actuated open position 33*a* and an electromagnetically switchable blocking position 33*b*.

A self-aspirating pump 36 with an electric drive motor 27 is assigned to the brake circuit I. The inlet side 38 of the pump 36 is connected via a return line 39 with the third connection 27.3 and 30.3 of the outlet valves 27 and 30 of the two first valve assemblies 25 and 2 of the brake circuit I. A reservoir 40 to receive pressure medium taken from the wheel brake cylinders 8 and 10 is connected to the return line 39. A feed line 42 originates at the outlet side 41 of the pump 36 and is connected to the brake line 6 of the wheel brake 9 of the powered vehicle wheel between the first valve assembly 25 and the second valve assembly 33.

The inlet side 38 of the pump 36 is also connected with the brake line 7 of the wheel brake 11 of the non-powered vehicle wheel by means of an aspirating line 45, namely between the main brake cylinder 3 and the first valve assembly 28 located in the brake line 7. A third valve assembly 46, embodied as a 2/2-way valve, is located in the aspirating line 45. The third valve assembly 46 has a spring-actuated blocking position 46*a* and an electromagnetically switchable open position 46*b*.

An overflow line 49, connected to the aspirating line 45 between the third valve assembly 46 and the main brake cylinder 3, originates at the brake line 6 between a connection of the feed line 42 with brake line 6 and the second valve assembly 33. A pressure relief valve 50 with a direction of flow from the brake line 6 towards the aspirating line 45 is disposed in the overflow line 49.

An auxiliary brake line 53 originates at the aspirating line 45 between the third valve assembly 46 and the inlet side 38 of the pump 36 and is connected to the brake line 7 of the non-powered vehicle wheel between the second connection 29.2 at the wheel brake side of the inlet valve 29 of the first valve assembly 28 and the wheel brake 11 of the non-powered vehicle wheel. This auxiliary brake line 53 contains a fourth, pressure-controllable valve assembly 54 in the form of a spring-loaded check valve with a direction of flow from the main brake cylinder 3 to the wheel brake cylinder 10 of the wheel brake 11. As suggested by dash-dotted lines, an auxiliary brake branch line 55 with a fourth, pressure-controllable valve assembly 56 embodied in the same way can be connected between the second connection 26.2 of the inlet valve 26 and the wheel brake cylinder 8 of the wheel brake 9 of the powered vehicle wheel to the brake line 6 of the latter.

On account of the identical embodiment of the brake circuit II, it has a first valve assembly 60 assigned to the brake line 16 and a first valve assembly 61 assigned to the brake line 17. A second valve assembly 62 is provided in the brake line 16; a third valve assembly 63 is located in an aspirating line 64 of a self-aspirating pump 65 of the brake circuit II, also driven by the motor 37. The pump 65 is connected by means of a feed line 66 with the brake line 16. Additionally, an overflow line 67 with a pressure relief valve 68 is provided.

The first valve assembly 60 has an inlet valve 71 and an outlet valve 72; the first valve assembly 61 consists of an inlet valve 73 and an outlet valve 74. A return line 75 with a reservoir 76 connected to it runs from the two outlet valves 72 and 74 to the pump 65. The aspirating line 64 is connected with the brake line 17 by means of an auxiliary brake line 77 having a pressure-controllable valve assembly 78 between the inlet valve 73 and the wheel brake cylinder 20. In the brake circuit II it is also possible to lead an auxiliary brake branch line 79 with a pressure-controllable valve assembly 80 to the brake line 16. The elements located within the dash-dotted frame are combined in a so-called hydraulic group 81 of the multi-circuit brake system 1.

The brake system 1 further has an electronic control device 8 which monitors the rotational behavior of the vehicle wheels, not shown, by means of rpm sensors 85 to 88, and switches the valves as well as the drive motor 37 in accordance with a preset control algorithm in the case of anti-skid control and traction control operation. A brake pedal-operated brake light switch 90 is also connected with the control device 84.

The multi-circuit brake system 1 has the following functions:

In case of braking triggered by the driver, while the valve assemblies of the brake system take up the illustrated positions, brake pressure is generated in the main brake cylinder 3 because of its activation. By means of the displacement of amounts of pressure medium in the brake lines 5, 6 and 7 of the brake circuit I as well a in the brake lines 15, 16 and 17 of the brake circuit II, pressure is transferred into the wheel brake cylinders 8, 10 as well as 18, 20 of the wheel brakes 9, 11 and 19, 21. Based on the signals from the rpm sensors 85 to 88, the control device 84 monitors the rotational behavior of the vehicle wheels during this time.

If in the course of such braking the powered vehicle wheel assigned, for example, to the wheel brake 9 threatens to lock up, the control device 84 switches the first valve assembly 25 in the brake line 6 into the position of pressure release, i.e. the inlet valve 26 is switched into the blocking position 26*b* and the outlet valve 27 into the open position 27*b*. Pressure medium now can flow off from the wheel brake cylinder 8 of the wheel brake 9 through the open valve 27, and the return line 39 into the reservoir 40, so that the brake pressure in the wheel brake cylinder 8 decreases. The pump 36, simultaneously switched on by the control device 84, feeds the pressure medium taken from the wheel brake cylinder 8 into the brake line 6 through the feed line 42. In accordance with the control algorithm stored in the control device 84, phases of pressure maintenance and pressure build-up follow the phase of pressure release in the wheel brake cylinder 8 of the wheel brake 9 until the powered vehicle wheel exhibits stable rotational behavior. In this case, the inlet valve 26 and the outlet valve 27 of the valve assembly 25 are switched into the blocking position 26*b* and 27*a* during pressure maintenance. During pressure build-up, the outlet valve 27 assumes its blocking position 27*a*, while the inlet valve 26 is switched into the open position 26*a*. At the completion of such a case of anti-skid control operation, the control device 84 switches the drive motor 37 of the pump 36 off.

However, if in the case of starting and acceleration of the vehicle the vehicle wheel assigned to the wheel brake 9 threatens to spin, this is also recognized by the control device 84 on the basis of signals from the rpm sensors 85 to 88. The control device 84 switches the second valve assembly 33 in the brake line 6 into the blocking position **33*b* and the third valve assembly 46 in the aspirating line 45 in the open position 46*b*. Simultaneously the drive motor 37 of the pump 36 is switched on and the inlet valve 29 of the first valve assembly 28 in the brake line 7 is switched into the blocking position 29*b*. The remaining valve of the brake system 1 remain in the positions illustrated. The self-aspirating pump 36 now aspirates pressure medium from the pressure medium reservoir 4 through the main brake cylinder 3, the main brake line 5 and the aspirating line 45. The pump 36 feeds the pressure medium through the feed line 42 into the brake line 6 and generates brake pressure in the wheel brake cylinder 8 of the wheel brake of the powered wheel experiencing excessive wheel slip. In accordance with the preset control algorithm, phases of pressure maintenance and pressure release follow, during which the first valve assembly 25 in the brake line 6 assumes the switching positions already mentioned in connection with the anti-skid control operation. In the case of such a traction control operation, pressure medium not taken up by the wheel brake cylinder 8 is diverted through the pressure relief valve 50 into the aspirating line 45**.

If, in the course of such a traction control operation at the wheel brake 9, the driver triggers braking by actuating the main brake cylinder 3, this is recognized by the control device 84 because of the closing of the brake light switch 90. The control device 84 switches the second valve assembly 33 in the brake line 6 into the open position **33*a* and the third valve assembly 46 in the aspirating line 45 into the blocking position 46*a*. Additionally, the first valve assemblies 25 and 28 in the brake lines 6 and 7 are switched into their positions illustrated for pressure build-up, so that the brake pressure generated by the main brake cylinder 3 can take effect in all wheel brake cylinders 8, 10, 18 and 20 of the vehicle. However, even before the valve assemblies in the brake circuit I which are a part of previously described traction control operation have been switched, particularly the switching of the inlet valve 29 into the open position 29*a*, it is already possible to supply brake pressure from the main brake cylinder 3 through the aspirating line 45, the third valve assembly 46, which is still in its open position 46*b*, the auxiliary brake line 53 and the fourth valve assembly 54 to the wheel brake cylinder 10 of the wheel brake 11 of the non-powered vehicle wheel. Supply of brake pressure to the wheel brake cylinder 20 of the wheel brake 21 of the other, non-powered vehicle wheel takes place in a corresponding manner. In a brake system 1 with fourth valve assemblies 56 and 80 assigned to the wheel brakes 9 and 19 of the powered vehicle wheels it is also possible, in case of traction control operation, for the brake pressure generated by the driver to become effective in the wheel brake cylinders 8 and 18 of these wheel brakes without delay, provided the inlet valves 26 and 71 take up their blocking position 26*b* or 71*b***.

Even in case of a non-functioning brake light switch 90 the control device 84 recognizes, in case of traction control operation, braking triggered by the driver: the brake pressure supplied to the wheel brake cylinders 10 and 20 of the wheel brakes 11 and 21 assigned to the non-powered vehicle wheels leads to a reduction of the circumferential speed of these wheels in comparison with the vehicle speed, which is recognized by the control device on the basis of the signals of the rpm sensors 86 and 88 and results in stopping the traction control operation. In a vehicle with fourth valve assemblies 56 and 80 assigned to the wheel brakes 9 and 19 of the powered vehicle wheels it is possible for the control device 84 to recognize a braking attempt of the driver by evaluating the signals of the rpm sensors 85 and 87, since during traction control operation the circumferential speed of a spinning wheel, which is above the vehicle speed, is reduced to a circumferential speed below the vehicle speed by means of supplying brake pressure via the fourth valve assembly.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A hydraulic multi-circuit brake system (1), with a traction and anti-skid control device associated with driven and non-driven wheels, each driven and non-driven wheel having a wheel brake cylinder, first and second main brake lines (5 and 15) connected to a main brake cylinder (3), which includes:

third and fourth brake lines (6, 7) are connected to the main brake line (5) and with each other in a brake circuit I that leads to a wheel brake (9) of a driven vehicle wheel and to a wheel brake (11) of a non-driven vehicle wheel, fifth and sixth brake lines (16 and 17) are connected with said second main brake line (15) and with each other in a brake circuit II that leads to a wheel brake (19) of a driven wheel and a wheel brake (21) of a non-driven wheel, said brake circuit I includes a first and a second valve assembly (25, 28), assigned to the wheel brakes (9, 11) of the driven and the non-driven vehicle wheels, said bake circuit II includes a third and fourth valve assembly (60, 61) assigned to the wheel brakes (19, 21) of the driven and the non-driven vehicle wheels, said first, second, third and fourth valve assemblies including switching positions for pressure build-up, pressure maintenance and pressure release, each of said first and third valve assemblies including a first connection (26.1) connected with said third and fifth brake line, respectively, in a side towards the main brake cylinder, a second connection (26.2) on a side towards the wheel brake for the third and fifth brake line (6, 16), respectively, and a third connection (27.3) connected with a seventh and eighth brake line (39 and 75) for pressure medium released from the driven wheel brakes (9, 19), a fifth and sixth valve assembly (33, 62), disposed in the third and fifth brake line (6, 16), respectively, of the driven vehicle wheels between the main brake cylinder (3) and the first and third valve assembly (25, 60), respectively, by means of which the brake line (6, 16) can be blocked in case of traction control operation, a first self-aspirating pump (36) for brake circuit I, an input side (38) of which is connected with the third connection (27.3) of the first valve assembly (25) as well as with the fourth brake line (7) of the non-driven vehicle wheel, a second self-aspirating pump (65) for brake circuit II, an input side (38) of which is connected with the third connection (27.3) of the third valve assembly (60) as well as with the sixth brake line (17) of the non-driven vehicle wheel, and the output side (41) of each pump (36, 65) is connected with the third and fifth brake line (6, 16), respectively, of the driven vehicle wheel between the first and fifth and third and sixth valve assembly (25, 33; 60, 62), the inlet side (38) of the first and second pumps (36, 65) is connected with the fourth and sixth brake line (7, 17) of the non-driven vehicle wheel between the second and fourth valve assembly (28, 61), which in case of traction control operation is switched into the pressure maintenance position, and the main brake cylinder (3) by means of first and second aspirating lines (45, 64), in which a seventh and eighth valve assembly (46, 63) is located, which in case of traction control operation opens the first and second aspirating lines (45, 64), first and second auxiliary brake lines (53, 77) originate at the first and second aspirating lines (45, 64) between the seventh and eighth valve assembly (46, 63) and the first and second pump (36, 65), which is connected between the second connection (29.2) with said fourth brake line located at the side thereof towards the wheel brake, of the second and fourth valve assembly (28, 61) and the wheel brake (11, 21) of the non-driven vehicle wheel to the fourth and sixth brake line (7, 17) and contains a first and second pressure-controllable valve (54, 78) with a direction of flow from the main brake cylinder (3) towards the wheel brake (11, 21).

2. A hydraulic multi-circuit brake system in accordance with claim 1, in which the third and firth brake line (6, 16) of the driven vehicle wheels is connected with the first and second aspirating lines (45, 64), respectively, via second and third auxiliary brake lines (55, 79), having a third and fourth pressure-controllable valve (56, 80), in the same way as the non-driven vehicle wheel.

3. A hydraulic multi-circuit brake system in accordance with claim 2, in which the first and second pressure controllable valve (54, 78) is embodied as a check valve.

4. A hydraulic multi-circuit brake system in accordance with claim 2, in which the third and fourth pressure controllable valve (56, 80) is embodied as a check valve.

5. A hydraulic multi-circuit brake system in accordance with claim 2, in which the first and second pressure controllable valve (54, 78) is embodied as a check valve, and said third and fourth pressure controllable valve (56, 80) is embodied as a check valve.

6. A hydraulic multi-circuit brake system in accordance with claim 1, in which the first and second pressure controllable valve (54, 78) is embodied as a check valve.

7. A hydraulic multi-circuit brake system in accordance with claim 1, in which the seventh and eighth valve assembly (46, 63) is a 2/2-way valve which is electromagnetically switched from a spring-actuated blocking position (46*a*) into an open position (46*b*).

* * * * *